US012750922B2

(12) United States Patent
Wu

(10) Patent No.: US 12,750,922 B2
(45) Date of Patent: Sep. 29, 2026

(54) METHOD AND DEVICE FOR PROLONGING THE SERVICE LIFE OF CERAMIC ELECTRIC HEATING ELEMENT UNDER DIRECT-CURRENT POWER SUPPLY CONDITION

(71) Applicant: Hon Kin Andes Wu, Hong Kong Special Administrative Region (CN)

(72) Inventor: Hon Kin Andes Wu, Hong Kong Special Administrative Region (CN)

( * ) Notice: Subject to any disclaimer, the term of this patent is extended or adjusted under 35 U.S.C. 154(b) by 700 days.

(21) Appl. No.: 18/031,488

(22) PCT Filed: Jan. 25, 2022

(86) PCT No.: PCT/CN2022/073605
§ 371 (c)(1),
(2) Date: Apr. 12, 2023

(87) PCT Pub. No.: WO2022/242222
PCT Pub. Date: Nov. 24, 2022

(65) Prior Publication Data

US 2023/0380015 A1 Nov. 23, 2023

(30) Foreign Application Priority Data

May 21, 2021 (CN) ......................... 202110555369.9

(51) Int. Cl.
*H05B 3/00* (2006.01)
*H05B 3/14* (2006.01)

(52) U.S. Cl.
CPC ........... *H05B 3/0019* (2013.01); *H05B 3/141* (2013.01)

(58) Field of Classification Search
CPC ...... H05B 3/0019; H05B 3/141; H05B 1/023; H05B 1/0202
See application file for complete search history.

(56) References Cited

U.S. PATENT DOCUMENTS

| | | | | |
|---|---|---|---|---|
| 5,908,572 A * | 6/1999 | Nagumo | ................ | H05B 3/141 219/505 |
| 2019/0294187 A1* | 9/2019 | Ying | ....................... | H02M 1/32 |

FOREIGN PATENT DOCUMENTS

| | | |
|---|---|---|
| CN | 2746648 | 12/2005 |
| CN | 201310363790 | 10/2015 |
| CN | 211127137 | 7/2020 |
| CN | 113163524 | 7/2021 |

(Continued)

*Primary Examiner* — Robert G Bachner
(74) *Attorney, Agent, or Firm* — FisherBroyles, LLP; Jason P. Mueller

(57) ABSTRACT

Disclosed in the present invention are a method and device for prolonging the service life of a ceramic electric heating body under a direct-current power supply condition. According to the solution, power can be supplied to a ceramic electric heating body in a forward-reverse inverting pulse manner under a direct-current condition, so that the service life of the ceramic electric heating body is prolonged. The beneficial technical effects of the present invention are: a method and device for prolonging the service life of a ceramic electric heating body under a direct-current power supply condition are provided; and the solution can effectively ameliorate the aging problem of a ceramic electric heating body, prolong the service life of the ceramic electric heating body, and ensure that the product performance is stable for a long time.

8 Claims, 1 Drawing Sheet

(56) References Cited

FOREIGN PATENT DOCUMENTS

| | | | |
|---|---|---|---|
| CN | 214851859 | | 11/2021 |
| CN | 114679801 | A | 6/2022 |
| DE | 102008033991 | | 1/2010 |
| GB | 2181485 | | 4/1987 |
| JP | H0543495 | | 2/1993 |
| JP | H09306638 | | 11/1997 |
| JP | H10160568 | | 6/1998 |
| KR | 20210081428 | | 7/2021 |
| KR | 20220061204 | | 5/2022 |

* cited by examiner

METHOD AND DEVICE FOR PROLONGING THE SERVICE LIFE OF CERAMIC ELECTRIC HEATING ELEMENT UNDER DIRECT-CURRENT POWER SUPPLY CONDITION

CROSS-REFERENCE TO RELATED APPLICATIONS

This application is a national stage entry application under 35 U.S.C. 371 of PCT Patent Application No. PCT/CN2022/073605, filed on Jan. 25, 2022, which claims priority to Chinese Patent Application No. 202110555369.9, filed on May 21, 2021, the entire contents of each of which are incorporated herein by reference.

TECHNICAL FIELD

The present invention relates to a ceramic electric heating body driving technology, and in particular, to a method and device for prolonging the service life of a ceramic electric heating body under a direct-current power supply condition.

BACKGROUND

Ceramic electric heating bodies are common parts, and are commonly used in devices such as heaters and igniters; and during use, the ceramic electric heating body is generally powered by a direct-current power source. The problems existing are:

on the one hand, the ceramic electric heating body is generally made of a ceramic material with ionic conductance and electronic conductance, and when a ceramic material with ionic conductance is heated to a certain temperature, metal ions in the ceramic material will migrate to a negative electrode under the action of a direct-current voltage, so that a redox reaction occurs; moreover, the metal ions will be accumulated at the negative electrode to form space charges, and after long-term use, the insulation resistance of the ceramic material will gradually increase; and on the other hand, for other electronic materials in the device, a metal electrode thereof will participate in a redox reaction under the action of a certain temperature and a strong direct current, electrons are lost at a positive electrode to form metal ions, and the metal ions will gradually diffuse into the electronic materials, causing aging of the electronic materials. The problem of electrochemical aging caused by direct-current power supply will greatly change the dielectric constant and the resistivity of the material, and directly affect the quality stability of the product.

From the introduction above, it would not be difficult to determine that the source of the problem lies in long-term directed migration of metal ions caused by direct-current power supply, and a simple solution is to use alternating-current power supply, but it is not allowed by the actual situation: first, for application scenarios in which only direct-current power supply can be provided, there is no feasibility of changing same to alternating-current power supply; and secondly, various technical indexes of existing products using direct-current power supply are designed on the premise of direct-current power supply, and if changing direct-current power supply into alternating-current power supply, the products need to be redesigned, and the research and development costs are high.

SUMMARY

In view of the problems in the Background, the present invention provides a method for improving the service life of a ceramic electric heating body under a direct-current power supply condition. The innovation thereof lies in that: related hardware comprises: a ceramic electric heating body, a direct-current power source and a control unit; a positive electrode of a direct-current power source output end is connected to a terminal I of the control unit, a negative electrode of the direct-current power source output end is connected to a terminal II of the control unit, a terminal III of the control unit is connected to a positive electrode of a ceramic electric heating body input end, and a terminal IV of the control unit is connected to a negative electrode of the ceramic electric heating body input end;

the control unit has two operating modes, i.e. mode I and mode II, and after the control unit is started, the control unit alternately operates in the mode I and mode II;

under the condition of mode I, the control unit matches the terminal I with the terminal III and matches the terminal II with the terminal IV, and at this time, the control unit transmits electric energy of the direct-current power source to the ceramic electric heating body in a pulse manner; and under the condition of mode II, the control unit matches the terminal I with the terminal IV and matches the terminal II with the terminal III, and at this time, the control unit transmits electric energy of the direct-current power source to the ceramic electric heating body in a pulse manner.

The described solution discloses "matches the terminal I with the terminal III and matches the terminal II with the terminal IV" and "matches the terminal I with the terminal IV and matches the terminal II with the terminal III", the match therein is to represent corresponding relationships between terminals in a single mode, and in consideration of the fact that in the solution, a pulse mode needs to be used to transmit electric energy in a single mode, directly expressing relationships between the terminals as "conducted" or "connected" is obviously not accurate, and therefore "match" is used. The inventor considers that, in conjunction with the teaching in the description of the present invention, a person skilled in the art who has relevant electrical knowledge should understand the technical meaning of "match".

The principle of the present invention is: on the one hand, after the control unit is started, the control unit can alternately operate in the mode I and mode II; in mode I and mode II, the corresponding relationships between the positive and negative electrodes of the direct-current power source output end and the positive and negative electrodes of the ceramic electric heating body input end are opposite; in the two modes, the migration directions of metal ions in the material under the action of a current are opposite, which can effectively avoid long-term unidirectional migration of the metal ions. On the other hand, in a single mode, the direct-current power source outputs electric energy to the ceramic electric heating body in a pulse manner, which can effectively avoid long-time continuous effect of a direct-current voltage, and effectively reduce the migration progress of the metal ions; under the effect of the described two aspects, the negative effect brought about by direct-current power supply can be effectively suppressed, so that the service life of the ceramic electric heating body is prolonged, thereby ensuring performance stability of the product.

Preferably, the control unit comprises a controller and an H-bridge circuit-based forward-reverse inverting circuit; the forward-reverse inverting circuit comprises four high-speed switch elements and corresponding connection conductive wires, wherein the four high-speed switch elements are respectively marked as switch I, switch II, switch III and switch IV; a single high-speed switch element comprises a connection end I, a connection end II and a control end, wherein the control end is connected to the controller, and the controller controls the connection and disconnection between the connection end I and the connection end II by outputting high or low level to the control end; and connection ends I of the switch I and the switch II are connected in parallel to the terminal I, connection ends II of the switch I and the switch III are connected in parallel to the terminal III, connection ends II of the switch II and the switch IV are connected in parallel to the terminal IV, and connection ends of the switch III and the switch IV are connected in parallel to the terminal II. During specific implementation, under the condition of mode I, the controller controls the switch II and the switch III to be opened, and at the same time, the controller controls one of the switch I and switch IV to be closed and the other to rapidly repeat actions of closing and opening; and under the condition of mode II, the controller controls the switch I and the switch IV to be opened, and at the same time, the controller controls one of the switch II and switch III to be closed and the other to rapidly repeat actions of closing and opening.

The H-bridge circuit-based forward-reverse inverting circuit is a very common circuit. This preferred solution only introduces necessary elements for implementing basic functions of the control unit, and provides a more perfect circuit structure. A person skilled in the art could make reasonable design according to actual situations with reference to the prior art, such as the forward-reverse inverting pulse power source disclosed in Chinese Patent no. CN 201310363790.5.

Preferably, the ceramic electric heating body is made of a ceramic material with ionic conductance.

On the basis of the solutions above, the present invention further provides a device for prolonging the service life of a ceramic electric heating body under a direct-current power supply condition. The innovation thereof lies in that: the device comprises a ceramic electric heating body, a direct-current power source and a control unit; a positive electrode of a direct-current power source output end is connected to a terminal I of the control unit, a negative electrode of the direct-current power source output end is connected to a terminal II of the control unit, a terminal III of the control unit is connected to a positive electrode of a ceramic electric heating body input end, and a terminal IV of the control unit is connected to a negative electrode of the ceramic electric heating body input end; the control unit comprises a controller and an H-bridge circuit-based forward-reverse inverting circuit; the forward-reverse inverting circuit comprises four high-speed switch elements and corresponding connection conductive wires, wherein the four high-speed switch elements are respectively marked as switch I, switch II, switch III and switch IV; a single high-speed switch element comprises a connection end I, a connection end II and a control end, wherein the control end is connected to the controller, and the controller controls the connection and disconnection between the connection end I and the connection end II by outputting high or low level to the control end; and connection ends I of the switch I and the switch II are connected in parallel to the terminal I, connection ends II of the switch I and the switch III are connected in parallel to the terminal III, connection ends II of the switch II and the switch IV are connected in parallel to the terminal IV, and connection ends of the switch III and the switch IV are connected in parallel to the terminal II.

Preferably, the ceramic electric heating body in the device is made of a ceramic material with ionic conductance.

The beneficial effects of the present invention are: a method and device for prolonging the service life of a ceramic electric heating body under a direct-current power supply condition are provided; the solution can effectively ameliorate the aging problem of a ceramic electric heating body, prolong the service life of the ceramic electric heating body, and ensure that the product performance is stable for a long time.

Figure 1:
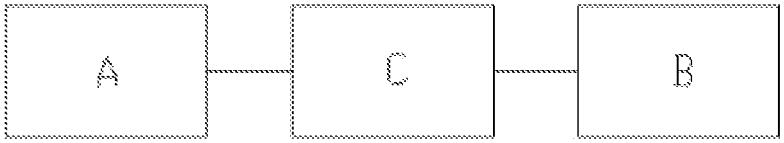
FIG. 1 is a schematic structural diagram of the present invention.
Figure 2:
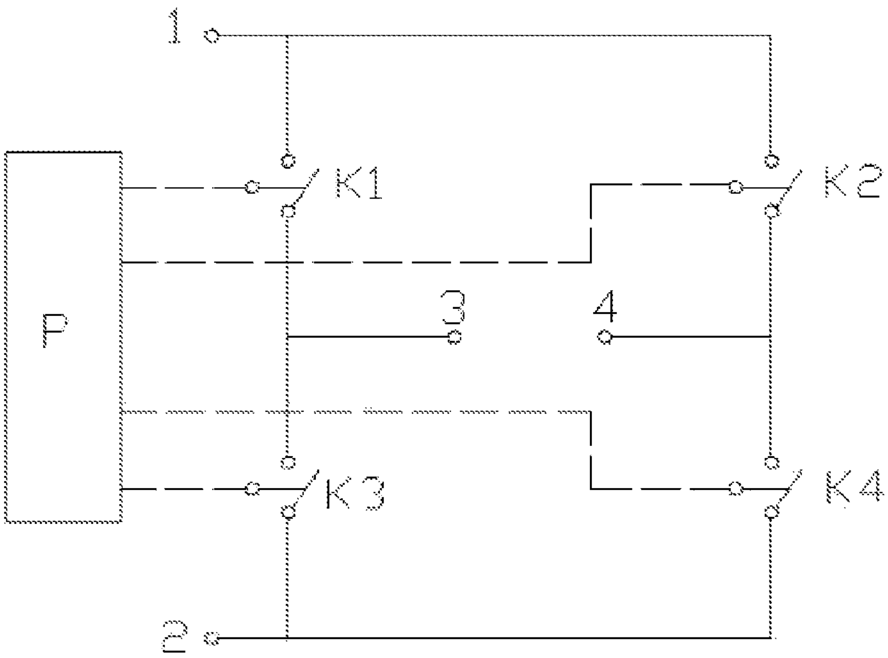
FIG. 2 is a schematic diagram of an electrical principle of a control unit (dotted lines in the figure represent electrical lines between a control end and a controller).

In the figures, names corresponding to various signs are respectively: terminal I 1, terminal II 2, terminal III 3, terminal IV 4, controller P, switch I K1, switch II K2, switch III K3, switch IV K4, ceramic electric heating body A, direct-current power source B, and control unit C.

DETAILED DESCRIPTION OF THE EMBODIMENTS

A method for prolonging the service life of a ceramic electric heating body under a direct-current power supply condition. The innovation thereof lies in that: related hardware comprises: a ceramic electric heating body, a direct-current power source and a control unit; a positive electrode of a direct-current power source output end is connected to a terminal I 1 of the control unit, a negative electrode of the direct-current power source output end is connected to a terminal II 2 of the control unit, a terminal III 3 of the control unit is connected to a positive electrode of a ceramic electric heating body input end, and a terminal IV 4 of the control unit is connected to a negative electrode of the ceramic electric heating body input end;

- the control unit has two operating modes, i.e. mode I and mode II, and after the control unit is started, the control unit alternately operates in the mode I and mode II;
- under the condition of mode I, the control unit matches the terminal I 1 with the terminal III 3 and matches the terminal II 2 with the terminal IV 4, and at this time, the control unit transmits electric energy of the direct-current power source to the ceramic electric heating body in a pulse manner; and
- under the condition of mode II, the control unit matches the terminal I 1 with the terminal IV 4 and matches the terminal II 2 with the terminal III 3, and at this time, the control unit transmits electric energy of the direct-current power source to the ceramic electric heating body in a pulse manner.

Further, the control unit comprises a controller P and an H-bridge circuit-based forward-reverse inverting circuit; the forward-reverse inverting circuit comprises four high-speed switch elements and corresponding connection conductive wires, wherein the four high-speed switch elements are respectively marked as switch I K1, switch II K2, switch III K3 and switch IV K4; a single high-speed switch element comprises a connection end I, a connection end II and a control end, wherein the control end is connected to the controller P, and the controller P controls the connection and disconnection between the connection end I and the connection end II by outputting high or low level to the control end; and connection ends I of the switch I K1 and the switch II K2 are connected in parallel to the terminal I 1, connection ends II of the switch I K1 and the switch III K3 are connected in parallel to the terminal III 3, connection ends II of the switch II K2 and the switch IV K4 are connected in parallel to the terminal IV 4, and connection ends of the switch III K3 and the switch IV K4 are connected in parallel to the terminal II 2.

Further, the ceramic electric heating body is made of a ceramic material with ionic conductance.

A device for prolonging the service life of a ceramic electric heating body under a direct-current power supply condition. The innovation thereof lies in that: the device comprises a ceramic electric heating body, a direct-current power source and a control unit; a positive electrode of a direct-current power source output end is connected to a terminal I of the control unit, a negative electrode of the direct-current power source output end is connected to a terminal II of the control unit, a terminal III of the control unit is connected to a positive electrode of a ceramic electric heating body input end, and a terminal IV of the control unit is connected to a negative electrode of the ceramic electric heating body input end; the control unit comprises a controller P and an H-bridge circuit-based forward-reverse inverting circuit; the forward-reverse inverting circuit comprises four high-speed switch elements and corresponding connection conductive wires, wherein the four high-speed switch elements are respectively marked as switch I K1, switch II K2, switch III K3 and switch IV K4; a single high-speed switch element comprises a connection end I, a connection end II and a control end, wherein the control end is connected to the controller P, and the controller P controls the connection and disconnection between the connection end I and the connection end II by outputting high and low level to the control end; and connection ends I of the switch I K1 and the switch II K2 are connected in parallel to the terminal I 1, connection ends II of the switch I K1 and the switch III K3 are connected in parallel to the terminal III 3, connection ends II of the switch II K2 and the switch IV K4 are connected in parallel to the terminal IV 4, and connection ends of the switch III K3 and the switch IV K4 are connected in parallel to the terminal II 2.

Further, the ceramic electric heating body in the device is made of a ceramic material with ionic conductance.

What is claimed is:

1. A method for prolonging the service life of a ceramic electric heating body attached to a direct-current power source via a control unit, wherein a positive electrode of the direct-current power source is connected directly to a terminal I (1) of the control unit, a negative electrode of the direct-current power source is connected directly to a terminal II (2) of the control unit, a terminal III (3) of the control unit is connected to a positive electrode of a ceramic electric heating body, and a terminal IV (4) of the control unit is connected to a negative electrode of the ceramic electric heating body, the method comprising:

alternately operating the control unit in a first mode I and in a second mode II, wherein;

during the first mode I, matching the terminal I (1) with the terminal III (3) and matching the terminal II (2) with the terminal IV (4), wherein the control unit transmits electric energy of the direct-current power source to the ceramic electric heating body in a first direction between the positive and negative electrodes of the ceramic heating body and transmits the electric energy in a pulse manner; and during the second mode II, matching the terminal I (1) with the terminal IV (4) and matching the terminal II (2) with the terminal III (3), wherein the control unit transmits electric energy of the direct-current power source to the ceramic electric heating body in a second direction between the positive and negative electrodes of the ceramic heating body and transmits the electric energy in a pulse manner.

2. The method for prolonging the service life of a ceramic electric heating body under a direct-current power supply condition according to claim 1, wherein the control unit comprises a controller and an H-bridge circuit-based forward-reverse inverting circuit having four high-speed switch elements and corresponding connection conductive wires, wherein the four high-speed switch elements are respectively marked as switch I (K1), switch II (K2), switch III (K3) and switch IV (K4); each high-speed switch element comprises a connection end I, a connection end II and a control end, wherein the control end is connected to the controller, and the controller (P) controls the connection and disconnection between the connection end I and the connection end II by outputting high or low level to the control end; and connection ends I of the switch I (K1) and the switch II (K2) are connected in parallel to the terminal I (1), connection ends II of the switch I (K1) and the switch III (K3) are connected in parallel to the terminal III (3), connection ends II of the switch II (K2) and the switch IV (K4) are connected in parallel to the terminal IV (4), and connection ends of the switch III (K3) and the switch IV (K4) are connected in parallel to the terminal II (2), the method further comprising:

operating the controller to control the connection and disconnection of the four high-speed switches to establish the first mode I and the second mode II.

3. The method for prolonging the service life of a ceramic electric heating body under a direct-current power supply condition according to claim 1, wherein the ceramic electric heating body is made of a ceramic material with ionic conductance and operating in the first mode I and in second mode II reduces directed migration of metal ions.

4. A device for prolonging the service life of a ceramic electric heating body under a direct-current power supply condition, wherein the device comprises:

a ceramic electric heating body having an input end with a positive electrode and a negative electrode;

a direct-current power source having an output end with a positive electrode and a negative electrode;

a control unit, alternately in a first mode I and a second mode II, selectively connecting the positive and negative electrodes of the ceramic electric heating body with the positive and negative electrodes of the direct-current power source, wherein:

the positive electrode of a direct-current power source is directly connected to a first terminal I of the control unit, the negative electrode of the direct-current power source is directly connected to a second terminal II of the control unit, a third terminal III of the control unit is connected to a positive electrode of a ceramic electric heating body, and a fourth terminal IV of the control unit is connected to a negative electrode of the ceramic electric heating body;

wherein during the first mode I, the control unit is configured to match the first terminal I with the third terminal III and match the second terminal II with the fourth terminal IV (4), wherein the control unit transmits electric energy of the direct-current power source to the ceramic electric heating body in a first direction between the positive and negative electrodes of the ceramic heating body and transmits the electric energy in a pulse manner; and wherein during the second mode II, the control unit is configured to match the terminal I (1) with the terminal IV (4) and match the terminal II (2) with the terminal III (3), wherein the control unit transmits electric energy of the direct-current power source to the ceramic electric heating body in a second direction between the positive and negative electrodes of the ceramic heating body and transmits the electric energy in a pulse manner.

5. The device for prolonging the service life of a ceramic electric heating body under a direct-current power supply condition according to claim 4, wherein the ceramic electric heating body is made of a ceramic material with ionic conductance.

6. The device for prolonging the service life of a ceramic electric heating body under a direct-current power supply condition according to claim 4, wherein:

the control unit comprises a controller (P) and an H-bridge circuit-based forward-reverse inverting circuit.

7. The device for prolonging the service life of a ceramic electric heating body under a direct-current power supply condition according to claim 6, wherein:

the forward-reverse inverting circuit comprises four high-speed switch elements switch I (K1), switch II (K2), switch III (K3) and switch IV (K4) and corresponding connection conductive wires, wherein each high-speed switch element comprises a connection end I, a connection end II and a control end, wherein the control end is connected to the controller (P), wherein the controller (P) is configured to control the connection and disconnection between the connection end I and the connection end II by outputting high or low level to the control end.

8. The device for prolonging the service life of a ceramic electric heating body under a direct-current power supply condition according to claim 7, wherein connection ends I of the switch I (K1) and the switch II (K2) are connected in parallel to the terminal I (1), connection ends II of the switch I (K1) and the switch III (K3) are connected in parallel to the terminal III (3), connection ends II of the switch II (K2) and the switch IV (K4) are connected in parallel to the terminal IV (4), and connection ends of the switch III (K3) and the switch IV (K4) are connected in parallel to the terminal II (2).

* * * * *